Patented Sept. 22, 1953

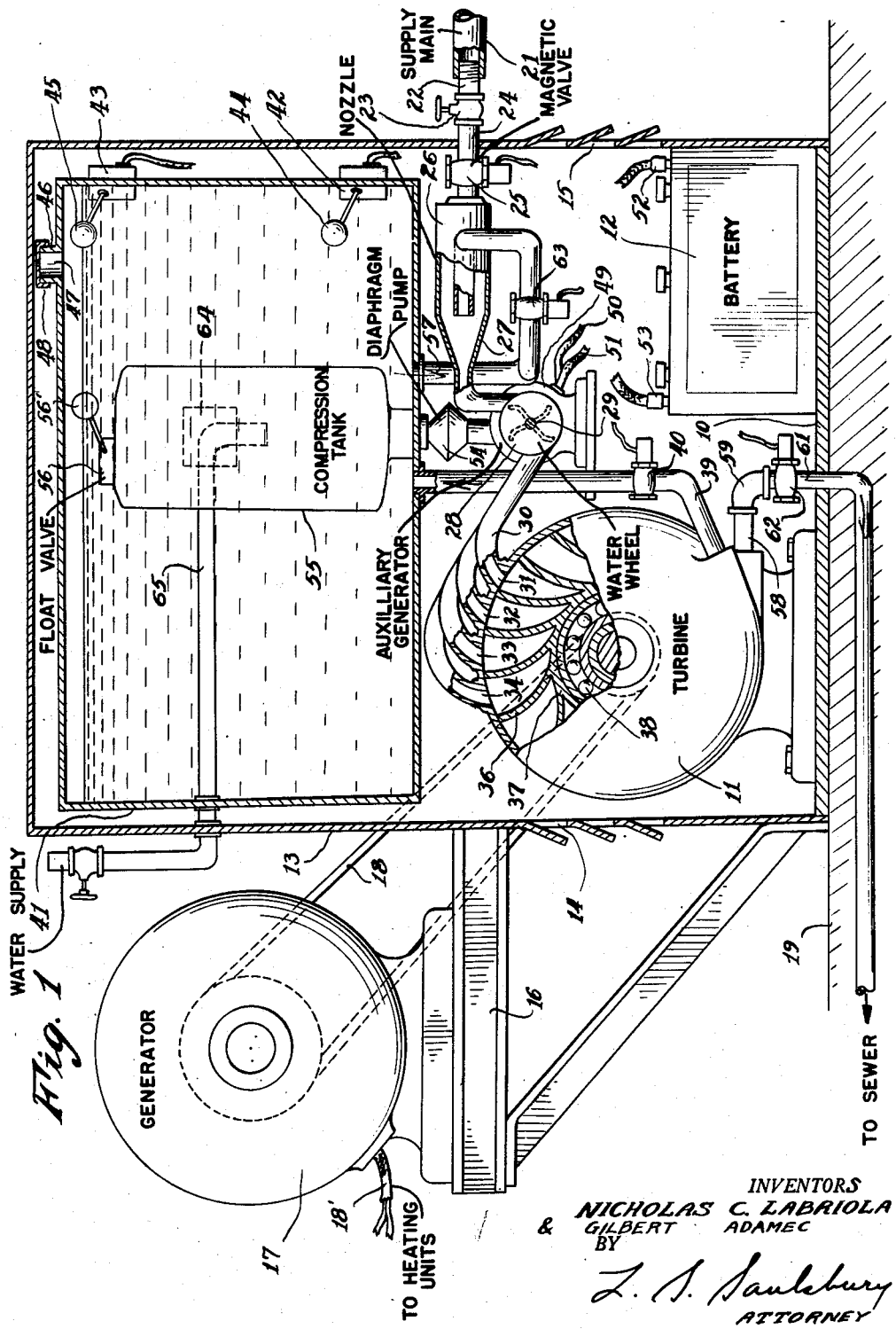

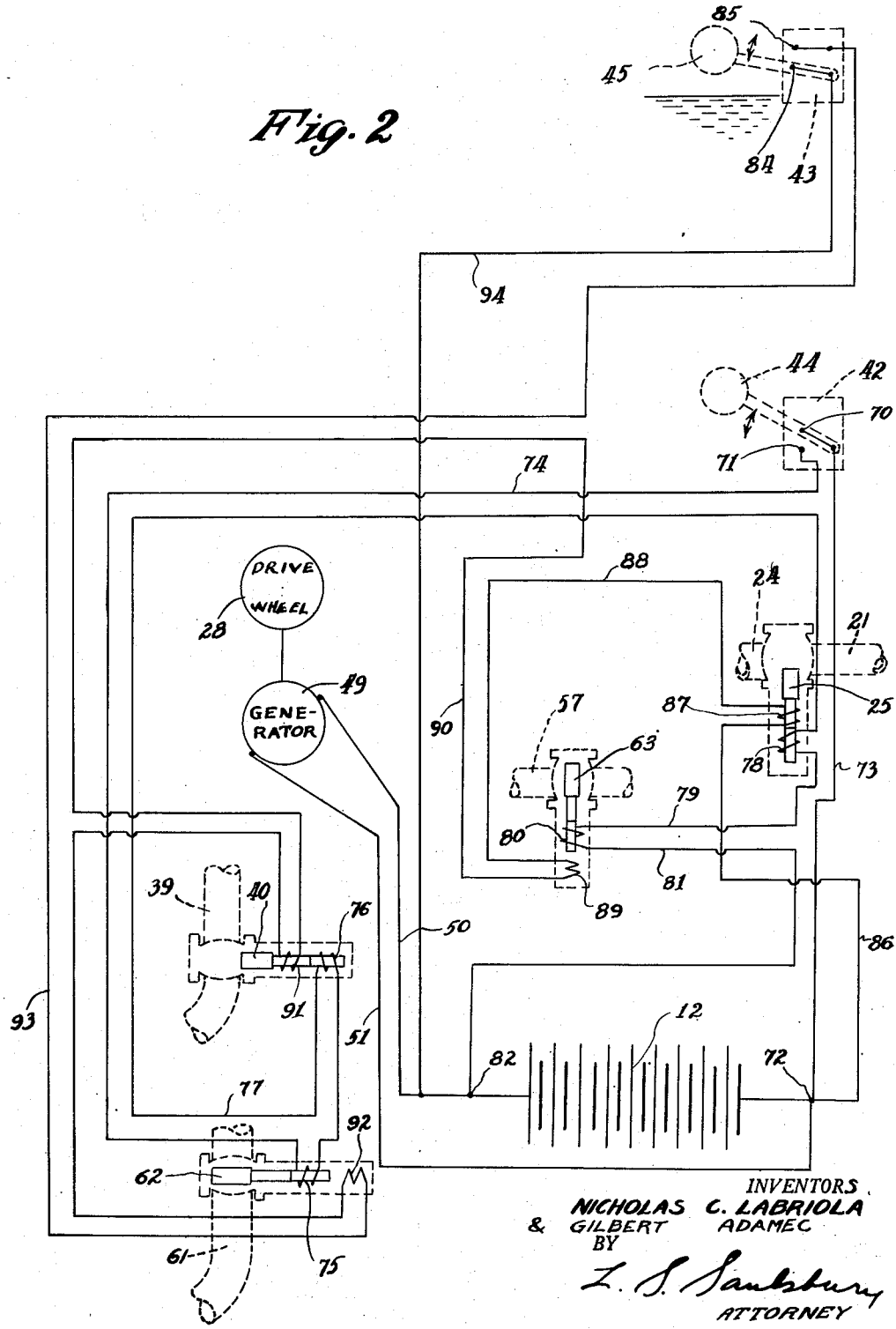

2,652,690

UNITED STATES PATENT OFFICE 2,652,690

UTILITY MASTER POWER UNIT

Nicholas C. Labriola, Youngstown, Ohio, and Gilbert Adamec, Bronx, N. Y.; said Adamec assignor to Minnie O'Brien Labriola Application September 27, 1951, Serial No. 248,482

4 Claims. (Cl. 60—55)

This invention relates to a watered power utility unit.

It is an object of the present invention to provide a utility unit adapted to be operated by water from the water supply main of a household or other building which will supply sufficient electric current for lighting and heating the household and to thereby reduce the requirements of equipment which are now generally needed for supplying the lighting and heating and water for the building.

It is another object of the invention to provide a water powered unit wherein the water which is used to drive the turbine wheel is stored and put under pressure, so that it can be used again to effect the operation of the turbine wheel, and wherein the water which is stored is automatically placed under air pressure upon the changeover from the supply of water to the turbine wheel from the main through the supply water from the storage water tank, and wherein an auxiliary pump operates a generator to charge the storage battery and at the same time operates a diaphragm pump to charge the air pressure container, which is operated to put the water storage tank under pressure after it has been filled to a predetermined level, and at the time of the changeover of water supply from the water main to the water being supplied from the storage tank.

It is another object of the invention to provide, in a water powered utility unit, a connection with the storage water tank for the water which has been received from the turbine wheel, and which is used over again wherein by merely turning on a water spigot in the household the pressure built up in the water storage tank and the air pressure supply unit therein will be sufficient to place on tap at all times a good water pressure source, thereby saving the water which has already been exhausted from the turbine wheel rather than to dissipate it to the sewer.

Other objects of the invention are to provide a water powered unit for household purposes which is of simple construction, is easy to install in the household, is inexpensive to manufacture, has a minimum number of parts, is compact, clean, provides adequate current for electric heating, conserves water and is efficient in operation.

For other objects and for a better understanding of the invention, references may be had to the following detailed description taken in connection with the accompanying drawing, in which:

Fig. 1 is a vertical sectional view of the unit with portions broken away to show the construction thereof and the arrangement of the parts within the main casing;

Fig. 2 is a wiring diagram of the arrangement and particularly of the various magnetically operated control valves, the storage battery and the generator for supplying current for maintaining this storage battery in a charged condition and to provide ample auxiliary current for the operation of the valves.

Referring now to the figures, 10 represents a base plate forming a part of the unit on which a turbine wheel 11 and a storage battery 12 are fixed. A casing 13 surrounds the base and extends upwardly to enclose the various parts of the unit. This casing has air vent openings 14 and 15 on the opposite ends thereof. On one end of the base and on the casing is a bracket 16 for supporting a generator 17 which is driven from the turbine wheel 11 by a pulley belt 18 to supply large quantities of electricity for operating electric heating units that can be distributed in the different rooms of the household. Cables 18' extend from the generator.

The unit is supported upon a floor 19 and the installation with the water supply main is readily effected. This supply main is indicated at 21 and into which there is extended a water nipple 22 having a control valve 23 so that the supply of water to the unit can be controlled. From the valve 23 and extending through the casing wall is a supply pipe unit 24 having a magnetic valve 25. This supply pipe 24 connects with a water nozzle 26 that tapers at 27 for connection with a small auxiliary water wheel unit 28 that rotates shaft 29. From this water wheel unit 28 there extends water supply manifold 30 that connects with the top of the turbine wheel casing and has ports 31, 33, 32 and 34 for directing the water under pressure upon blades 36 of turbine rotor 37 that is mounted to a ball bearing unit 38 within the turbine wheel casing.

The water pressure from the main is sufficient to run the auxiliary wheel 28 and upon being connected through the manifold 30 will operate the large turbine wheel 11 and accordingly the generator 17 will be driven. Water leaving the turbine wheel 11 passes upwardly through a pipe 39 having a magnetic control valve 40 and to a water storage tank 41. This water storage tank has a low level float switch 42 and a high level float switch 43 operated respectively by ball floats 44 and 45. On the top of the storage tank 41 is an upstanding projection 46 having opening 47 and on which there is secured a vent cap 48.

The water wheel 28 operates an electric generator 49 to deliver current through cables 51 to storage battery 12 having respectively terminals 52 and 53 for the respective wires or cables 49 and 51.

This same water wheel 28 operates a diaphragm pump 54 that delivers air under pressure to a compression tank 55 having a float valve 56 on the upper end of the same. This compression tank 55 is located within the water storage tank 41.

When sufficient water has been delivered from the turbine wheel 11 through the pipe 39 to the water storage tank 41, ball float switch 43 will be closed to condition the unit for the use of the water which has been stored in the tank 41 and to cut off the source of supply of water from the water main 21. The float valve 56 will permit air under pressure to be exhausted into the water tank 41 so that the water collected therein is placed under pressure. This water then flows downwardly under pressure to a pipe 57 into the water nozzle 26 and this water serves to run the water turbine wheel 11 and water will be discharged through a water outlet pipe 58 that is connected through an elbow 59 to a sewer pipe 61 having a magnetic valve 62. The outlet pipe 57 has a magnetic valve 63 coacting with magnetic valve 25 to effect ejector action upon a flow of water from the water main.

On the side of the compressor tank 55 is a valve arrangement 64 which is connected to a water supply pipe 65 that extends outwardly through the tank wall and through the casing 13 so that water can be supplied to the household. This valve 64 is arranged so that the water within the tank 41 can be placed under pressure automatically upon a water spigot within the household being turned on and accordingly this water which has been used for operating the turbine wheel can be saved by making it a source of supply of water to the household spigots. If hot water is desired in the household, electric heating elements can be placed at the spigot.

With the float 44 of the float switch 42 lowered as when a water in the storage tank 41 has been exhausted, contact 70 of the float arm will engage contact 71 which is fixed, Fig. 2, to establish a circuit beginning with terminal 72 of storage battery 12, wire 73, movable switch contacts 70, fixed switch contact 71 of float switch 42, wire 74, solenoid 75 of magnetic valve 62 to close the valve, and therefore to assume the position as shown, solenoid 76 of valve 40 to open position to allow flow through pipe 39 to the tank 41, wire 77, solenoid 78 of valve 25 in the pipe 24 to open the flow of water from the main line 21, assuming valve 23 is open, wire 79 to solenoid 80 of valve 63 in pipe 57 to close the valve element and wire 81 to terminal 82 at the opposite side of the battery 12. All valves are now positioned to start the flow from the main line through the drive wheel 28, manifolds 30 to 34, turbine wheel 11, pipe 39 and to exhaust in water storage tank 41.

As the water level is built up in the storage tank 41, air is being compressed in compression tank 55 by diaphragm pump 54 that is operated by the drive wheel 28. On the float 45 being elevated, the switch 43 will become closed. Movable contact 84 will engage fixed contact 85 to close an electric circuit as to position the several valves for the use of the water stored in the storage tank 41, and so that it can be used over again. The electric current starting from terminal 72 on through wire 86 to solenoid 87 of valve 25 to cause it to be closed and to shut off the water supply from the main line, wire 88, solenoid 89 of valve 63 to open the same and to allow water to pass downwardly from the water storage tank through pipe 57 to the nozzle 26, wire 90, solenoid 91 of valve 40 to close off the water in the pipe 39 that is connected to the turbine wheel 11, solenoid 92 to open valve 62 in the sewer line 61. Wire 93, contact 85 of switch 43, movable contact 84 and wire 94 to terminal 82 of the battery.

At the same time float 45 of the float switch 43 is operated, float 56' of the discharge valve 56 of the compression tank 55 is lifted to open the valve and to cause compressed air to be discharged into the storage tank so that water under pressure is now forced downwardly through pipe 57 and into nozzle 26, drive wheel 28, manifold 30, turbine wheel 11, discharge outlet pipe 58 and sewer pipe 61, whereby the turbine wheel 11 will be run by the stored water, this is accordingly saved. If desired, the pipe 61 that normally leads to the sewer could be run to a storage tank elsewhere in the building in order that a permanent supply of water can be had and to prevent waste of the water.

At both times the generator 17 will be run in the same direction so that a steady flow of current is delivered to the heating units disposed elsewhere in the building.

At any time a supply of water can be taken from the tank 41. The compression tank 55 will be used for applying pressure to the water which will leave through pipe 65 and valve 64 on the compression tank 55. It should be apparent that there has been provided an efficient water powered unit whereby ample current can be supplied to the household through the generator 17 which is operated by the turbine wheel 11 and wherein there is provided a storage tank in which water once used in the turbine 11 can be accumulated and used over again under pressure when the water main 21 is closed off. It should further be apparent that there has been provided a water powered unit wherein water can be taken off at any time and wherein the storage tank is supplied by air from a compression tank that is charged by a diaphragm pump at times when the water is being taken from the water main and utilized to discharge the water which has accumulated in the water tank. The operation is automatic and by means of the float switches, valves are controlled which will condition the arrangement for the use of water first from the main line and thereafter from the storage tank. A generator 49 supplies current to the battery 12. It will be apparent that this unit is easy to install within a home and that is clean and efficient.

While various changes may be made in the detailed construction, it should be understood that such changes shall be within the spirit and scope of the appended claims.

What is claimed is:

1. A water powered utility unit comprising a water turbine wheel, a supply pipe arrangement for delivering water under pressure from a main to the water wheel turbine, a water storage tank, pipe means extending from the water wheel turbine to said water storage tank, outlet pipe means extending from the water storage tank to said water pipe supply means for the turbine wheel whereby water from the water storage tank may be utilized for driving the water turbine wheel, and valve control means for cutting off the water supply means from the main and for utilizing the water accumulated in the water storage tank upon the water storage tank receiving a large quantity of water and coming to a predetermined level, power generating means connected to the water turbine wheel to be operated by the same and a further discharge pipe means for the removal of the water from the water wheel upon the same being operated by water from the storage tank.

2. A water powered utility unit comprising a water turbine wheel, an electric generator connected to said water turbine wheel, a water supply pipe means adapted for connection to a water main including an auxiliary water drive wheel, an auxiliary electric generator connected to the water drive wheel to be driven by the same and a manifold connected to the water turbine, a storage battery connected to the auxiliary generator to be charged by the same, a water storage tank, a discharge pipe means connected between the turbine wheel and the water storage tank to deliver the discharged water thereto, pipe means leading from the water storage tank to the main line water supply means, magnetic valves disposed in the main line pipe supply means, the discharge pipe from the turbine wheel extending to the water storage tank, and the pipe means leading from the water storage tank to the main line pipe means; pipe means leading from the water turbine wheel, said water supply pipe means having a magnetically operated valve, water level float switches in the water storage tank and electric circuit means including said water level control switches and said magnetic valves and the storage battery whereby water may be delivered to the turbine wheel either from the main pipe line supply means or from the water storage tank and automatically in sequence under the control of the water level float switch devices.

3. A water powered utility unit comprising a water turbine wheel, a supply pipe arrangement for delivering water under pressure from a main to the water wheel turbine, a water storage tank and pipe means extending from the water wheel turbine to receive water therefrom, outlet pipe means extending from the water storage tank to a water pipe supply means for the turbine wheel whereby water from the water storage tank may be utilized for driving the water turbine wheel, and valve control means for cutting off the water supply means from the main and for utilizing the water accumulated in the water storage tank upon the water storage tank receiving a large quantity of water and coming to a predetermined level, power generating means connected to the water turbine wheel to be operated by the same and a further discharge pipe means for the removal of the water from the water wheel upon the same being operated by water from the storage tank, and a compression tank disposed within the water storage tank and having a float operated valve, and pump means associated with said main line water supply means for charging said compression tank, said float control valve of the compression tank being operable with said control means for the pipe lines whereby to charge the water storage tank with air to cause the discharge of water flow from the water storage tank to be placed under pressure automatically upon being used to operate the water turbine.

4. A water powered utility unit comprising a water turbine wheel, a water supply pipe means adapted for connection to a water main including an auxiliary water drive wheel, an electric generator connected to the water drive wheel to be driven by the same and a manifold connected to the water turbine, a storage battery connected to the auxiliary generator to be charged by the same, a water storage tank, a discharge pipe means connected between the turbine wheel and the water storage tank to deliver the discharged water thereto, pipe means leading from the water storage tank to the main line water supply means, magnetic valves disposed in the main line pipe supply means, the discharge pipe from the turbine wheel extending to the water storage tank, the pipe means leading from the water storage tank to the main line pipe means, pipe means leading from the water turbine wheel and said pipe means having a magnetically operated valve, water level float switches in the water storage tank and electric circuit means including said water level control switches and said magnetic valves and the storage battery whereby water may be delivered to the turbine wheel either from the main pipe line supply means or from the water storage tank and automatically in sequence under the control of the water level float switch devices, an electric generator connected to the water turbine wheel, and a compression tank disposed within the water storage tank, pump means operable by the auxiliary water wheel for charging the compression tank with air, said compression tank having a float valve disposed at the level of the water float switch operable at the high elevation of the water in the water storage tank whereby the water in the water storage tank will be placed under pressure automatically upon the magnetic valves being operated to effect the flow of water from the water storage tank through the water turbine.

NICHOLAS C. LABRIOLA.
GILBERT ADAMEC.

References Cited in the file of this patent

UNITED STATES PATENTS

| Number | Name | Date |
|---|---|---|
| 255,312 | Maxim | Mar. 21, 1882 |
| 933,905 | Igatz | Sept. 14, 1909 |
| 1,002,676 | Gray | Sept. 5, 1911 |
| 1,582,715 | Wensley | Apr. 27, 1926 |

FOREIGN PATENTS

| Number | Country | Date |
|---|---|---|
| 127,780 | Great Britain | June 12, 1919 |